United States Patent
Barr et al.

(10) Patent No.: US 10,572,330 B2
(45) Date of Patent: *Feb. 25, 2020

(54) REDUCING SIZE OF DIAGNOSTIC DATA DOWNLOADS

(71) Applicant: International Business Machines Corporation, Armonk, NY (US)

(72) Inventors: Arthur J. Barr, Swindon (GB); Oliver M. Deakin, Southampton (GB)

(73) Assignee: International Business Machines Corporation, Armonk, NY (US)

(*) Notice: Subject to any disclaimer, the term of this patent is extended or adjusted under 35 U.S.C. 154(b) by 78 days.

This patent is subject to a terminal disclaimer.

(21) Appl. No.: 15/606,464

(22) Filed: May 26, 2017

(65) Prior Publication Data

US 2017/0262327 A1 Sep. 14, 2017

Related U.S. Application Data

(63) Continuation of application No. 14/799,940, filed on Jul. 15, 2015.

(30) Foreign Application Priority Data

Jul. 23, 2014 (GB) .................................. 1413065.2

(51) Int. Cl.
*G06F 11/07* (2006.01)
*G06F 11/30* (2006.01)
*H04L 12/26* (2006.01)

(52) U.S. Cl.
CPC ........ *G06F 11/079* (2013.01); *G06F 11/0748* (2013.01); *G06F 11/0751* (2013.01);
(Continued)

(58) Field of Classification Search
CPC ............. G06F 11/0709; G06F 11/0748; G06F 11/0751; G06F 11/0706; G06F 11/0784; G06F 11/079; G06F 11/0781; G06F 11/3065

See application file for complete search history.

(56) References Cited

U.S. PATENT DOCUMENTS

| | | | | |
|---|---|---|---|---|
| 5,802,301 A | * | 9/1998 | Dan | ........................ G06F 3/061 348/E5.008 |
| 6,018,780 A | * | 1/2000 | Fenchel | .................. H04L 67/06 709/230 |

(Continued)

FOREIGN PATENT DOCUMENTS

| | | |
|---|---|---|
| EP | 2696750 A1 | 2/2014 |
| JP | 2010218390 A | 9/2010 |
| WO | 2012142462 A1 | 10/2012 |

OTHER PUBLICATIONS

GB Search Report No. GB1413065.2 dated Jan. 20, 2015, pp. 3.

(Continued)

*Primary Examiner* — Joseph O Schell
(74) *Attorney, Agent, or Firm* — James L. Olsen (57) ABSTRACT

Aspects are related to reducing size of diagnostic data downloads. To reduce the size, format and content are read from a diagnostic data file so that pre-defined priority rules may be applied to the diagnostic data file and/or a subset of the diagnostic data file utilizing the format or the content. Then, a priority level is assigned to the diagnostic data file or the subset based on an ability of that file or that subset to diagnose a failure as determined by the pre-defined priority rules. Next, an ordering of the diagnostic data file and/or the subset into a file stream occurs, followed by a streaming of the file stream to a remote diagnostic system. A notification can be received from the remote diagnostic system to stop the streaming if sufficient diagnostic data to diagnose the failure has been received by the remote diagnostic system.

13 Claims, 6 Drawing Sheets

(52) U.S. Cl.
CPC ...... *G06F 11/0781* (2013.01); *G06F 11/0784* (2013.01); *G06F 11/0706* (2013.01); *G06F 11/0709* (2013.01); *G06F 11/3065* (2013.01); *H04L 43/02* (2013.01)

(56) References Cited

U.S. PATENT DOCUMENTS

| | | | |
|---|---|---|---|
| 6,681,348 B1* | 1/2004 | Vachon | G06F 11/0778 714/38.11 |
| 7,913,115 B1* | 3/2011 | Powers | G06F 11/0748 714/18 |
| 8,060,461 B2 | 11/2011 | Chi et al. | |
| 8,438,275 B1 | 5/2013 | Brooker | |
| 9,378,368 B2* | 6/2016 | Piper | G06F 11/0748 |
| 2005/0050557 A1 | 3/2005 | Gabry et al. | |
| 2007/0299943 A1* | 12/2007 | Ogle | G06F 11/0748 709/221 |
| 2009/0216967 A1 | 8/2009 | Sugawara | |
| 2015/0178163 A1* | 6/2015 | Chang | H04L 67/06 709/201 |
| 2016/0028845 A1 | 1/2016 | Barr | |

OTHER PUBLICATIONS

Decision to Grant a Patent, Application No. GB1413065.2, dated Apr. 19, 2016. 2 pages.
Letter of Examination, Application No. GB1413065.2, dated Mar. 29, 2016. 1 page.
List of IBM Patents or Patent Applications Treated as Related, May 26, 2017. 2 pages.

\* cited by examiner

REDUCING SIZE OF DIAGNOSTIC DATA DOWNLOADS

BACKGROUND

Diagnostics data recorded for the purposes of failure diagnosis in complex systems are often very extensive, leading to large file sizes and download times. While this extensive diagnostics data is a necessity of supplying maximal first failure data capture, it is at the expense of increased data volume, which often contains high quantities of redundant data.

When downloading large diagnostics bundles over, for example, a restricted bandwidth network, download times can become very large even though the amount of data in the bundle that is actually relevant and helpful to failure diagnosis is likely to be proportionally small.

An approach to this problem includes breaking down diagnostics into smaller, possibly feature-centric, bundles. This approach requires a well architected organization of diagnostic data and usually some manual process to decide the full set of bundles required to diagnose a failure. Further, any addition of product components, and thus diagnostics, results in reworking bundle content. Also, bundles are likely to contain a potentially large amount of data that is not helpful to diagnosing the failure.

Another approach includes reducing the amount of diagnostics data that is produced. Yet, components with reduced diagnostics may still fail, while failing to produce enough trace to diagnose the problem.

SUMMARY

An embodiment includes a system and computer program product for reducing a size of diagnostic data downloads. To reduce the size, format and content are read from a diagnostic data file so that pre-defined priority rules may be applied to the diagnostic data file and/or a subset of the diagnostic data file utilizing the format or the content. Then, a priority level is assigned to the diagnostic data file or the subset based on an ability of that file or that subset to diagnose a failure as determined by the pre-defined priority rules. Next, an ordering of the diagnostic data file and/or the subset into a file stream occurs, followed by a streaming of the file stream to a remote diagnostic system. A notification can be received from the remote diagnostic system to stop the streaming if sufficient diagnostic data to diagnose the failure has been received by the remote diagnostic system. This method can be embodied, executed, and/or employed in/by a system or computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter regarded as the invention is particularly pointed out and distinctly claimed in the concluding portion of the specification. Embodiments of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth to provide a thorough understanding of embodiments of the invention. However, it will be understood by those skilled in the art that embodiment of the present invention may be practiced without these specific details. In other instances, well-known methods, procedures, and components have not been described in detail so as not to obscure embodiments of the present invention.

A method, a system, and/or computer program product are provided for size reduction of required diagnostic downloads. The described method, system, and/or computer program product utilize an importance of diagnostic data (files and contents) to prioritize data streamed over the wire. Data that is expected to be most crucial to failure diagnosis will be transferred first. Thus in addition to executing at a file level, data subsets in files will be streamed based on the importance of that data to problem diagnosis.

The method, system, and/or computer program product can enable a problem diagnoser to very quickly receive a subset of the diagnostics containing the most crucial data that is progressively enhanced to contain a deeper level of information over time. The method, system, and computer program product can also allow the problem diagnoser to cancel a download process when the problem diagnoser determines that it has enough information to diagnose an issue, which may be some at a time before a full download is completed. In this way, the method, system, and/or computer program product reduce a volume of data transferred and a time required to receive sufficient diagnostic data.

Figure 1:
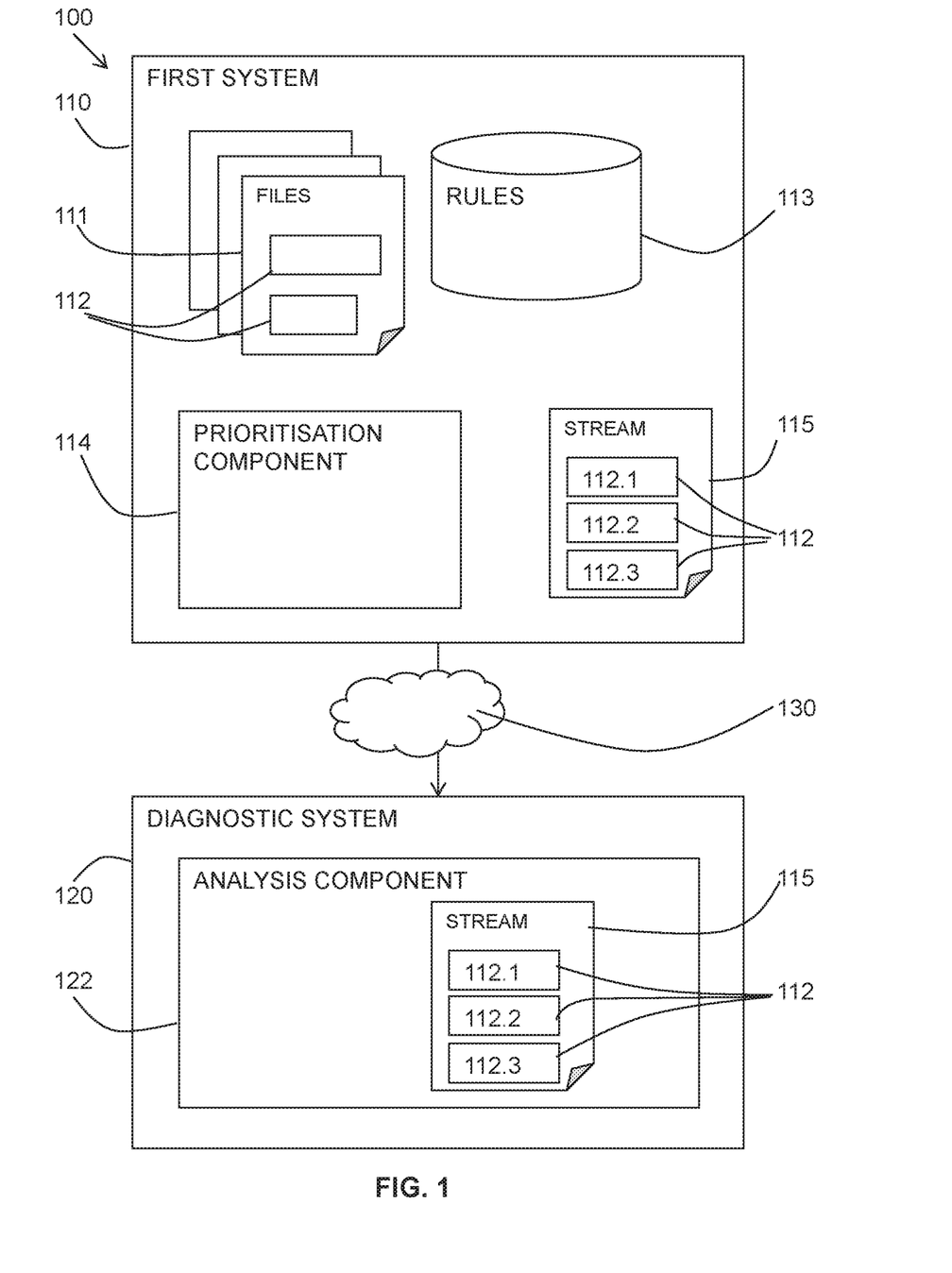
FIG. 1 is a block diagram of a system in accordance with an embodiment of the present invention.

Referring to FIG. 1, an example embodiment is illustrated via a block diagram 100 having a first system 110 at which diagnostic data is collected as files 111 (such as log and trace files) from which problems with the first system 110 may be analyzed and diagnosed. A diagnostic system 120 can be provided remotely to the first system 110, and communication with the diagnostic system 120 may be over a network 130 that can have a restricted bandwidth.

File sections 112 from the files 111 can be prioritized by a prioritization component 114 according to pre-defined priority rules 113 and streamed into a diagnostic data stream 115 for transmitting to the diagnostic system 120. Three file sections 112 are shown prioritized as "112.1", "112.2", and "112. 3" in the stream 115. Whole files 111 as well as or instead of file sections or subsets of files can also be prioritized in the stream 115.

The diagnostic system 120 may rebuild portions of files from the stream 115 and carry out analysis and diagnosis by an analysis component 122 on the stream 115.

Figure 2:
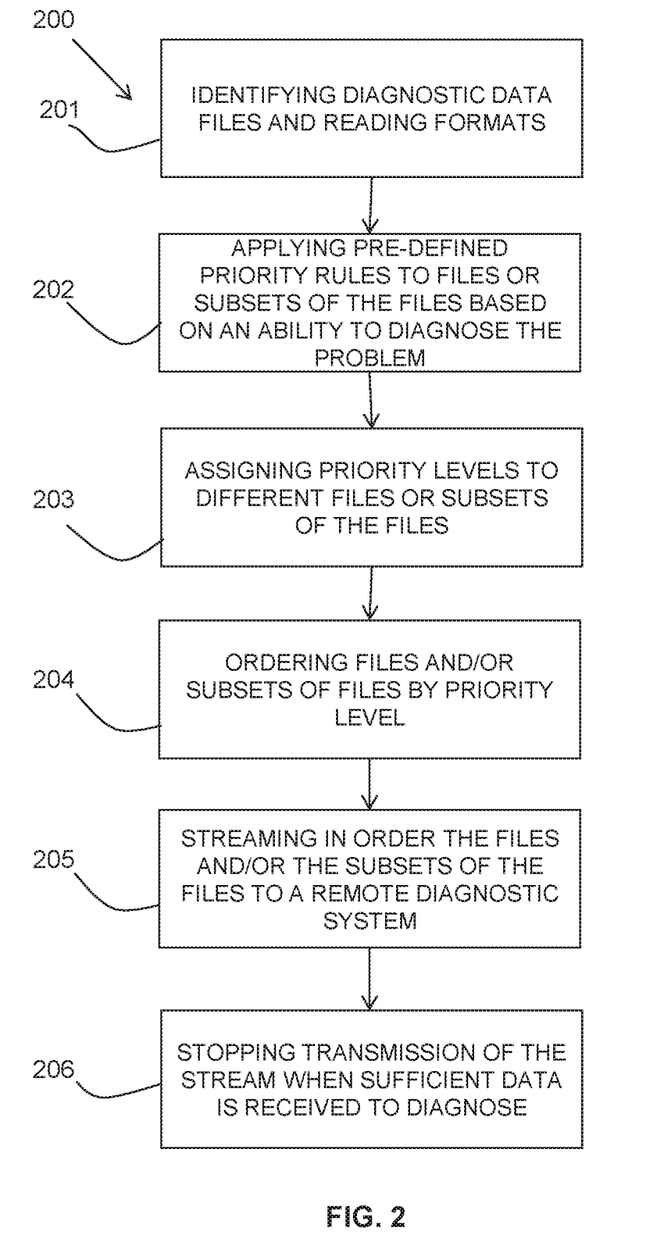
FIG. 2 is a flow diagram of a method in accordance with an embodiment of the present invention.

Referring to FIG. 2, a process flow 200 shows an embodiment of the overall described method.

At block 201, diagnostic data files for a system are identified and formats of those files are read. Examples of formats include but are not limited to a core file, trace file, log file, etc. Next, at block 202, pre-defined priority rules are applied to whole files or subsets or sections of the files using the corresponding formats and/or content to determine a priority level of a file or subset based on that file or subset's ability to diagnose a problem or a failure.

At block 203, a priority level is assigned to different files or subsets of the files. At block 204, the files or subsets of the files may be ordered by priority level. Then, at block 205, the files or the subsets of the files are streamed in priority level order to a remote diagnostic system.

At block 206, the transmission of the stream can be stopped when sufficient data has been received by the remote diagnostic system to identify the problem and diagnose the failure.

The streamed diagnostic data may have a reduced volume of data that is required to be downloaded by the remote diagnostic system that results in a reduced download time before sufficient data is received to perform a problem determination and diagnosis.

The prioritization of files and subsets of the files can be carried out at multiple levels of granularity. Files may be prioritized based on their type and/or content. Subsets formed from sets of data elements may also be prioritized. The subsets can be of variable length depending on a number of data elements in a set. The content of data elements themselves may prioritize an individual data element, or a set to which the data element belongs.

In one embodiment of prioritizing diagnostic data, multiple levels of granularity are utilized to determine the eventual stream ordering, such as:
 i) A priority ordering by file type, e.g., first failure data capture (FFDC) files would be higher priority than log files.
 ii) For each file type from (i), a structure may be defined that, when applied to a file of that type, would result in a set of individual data elements that are subsets of the file. For example, in core dumps this may be defined by a set of offsets defining where each region of the file starts; in trace files this may be defined using new line characters as delimiters between elements so each line becomes an individual element. These individual elements may have an implied priority ordering from knowledge of the file structure. For example, in core dumps, stack information would be prioritized over a dump of the memory allocated by the process.
 iii) For each element from (ii), the content of the element may be additionally processed to determine its priority relative to other elements. For example, in trace files, elements containing the SEVERE eye-catcher would be prioritized over INFO.

Note that his embodiment can be enhanced to prioritize which files to send first as well as their content, for example, send critical and major lines from file A before sending any from file B.

In addition, the order may grow from a point of high priority outwards. For example, based on the assumption that most failures have the most useful diagnostics close to the failure point, the streamed data may start by sending the highest severity trace lines at the failure point, then progressively send trace lines before and after those lines. As another approach, the rules may prioritize transferred trace based on time. For example, 10 seconds, around the failure time in each log file will be considered highly likely to be relevant to the failure and should therefore be prioritized.

A first embodiment of a further aspect of the method is described in which the streamed diagnostic data is streamed in a format in which multiple files are collected into a single file for downloading, such as Tape Archive (TAR) format. TAR formats are used to collect many files into single file for distribution and downloading while preserving the file system information.

As an illustration, the following scenario is considered. A product produces two large trace files, traceA.log and traceB.log; each trace file contains trace lines at critical, major, minor, and debug levels. The connection to the machine hosting the product has very restricted bandwidth, making it vital to minimize the data required to be downloaded to diagnose a failure.

A priority policy based on the severity of trace lines can be defined, with critical the highest priority and debug the lowest. A stream format, such as Tape Archive (TAR), can be used for the download, allowing multiple different versions of the same file to the written to the stream with the most recent version overwriting any previous version. For example, two files with the same name can appear in the stream, with the second file overwriting the content of the first.

Figure 3:
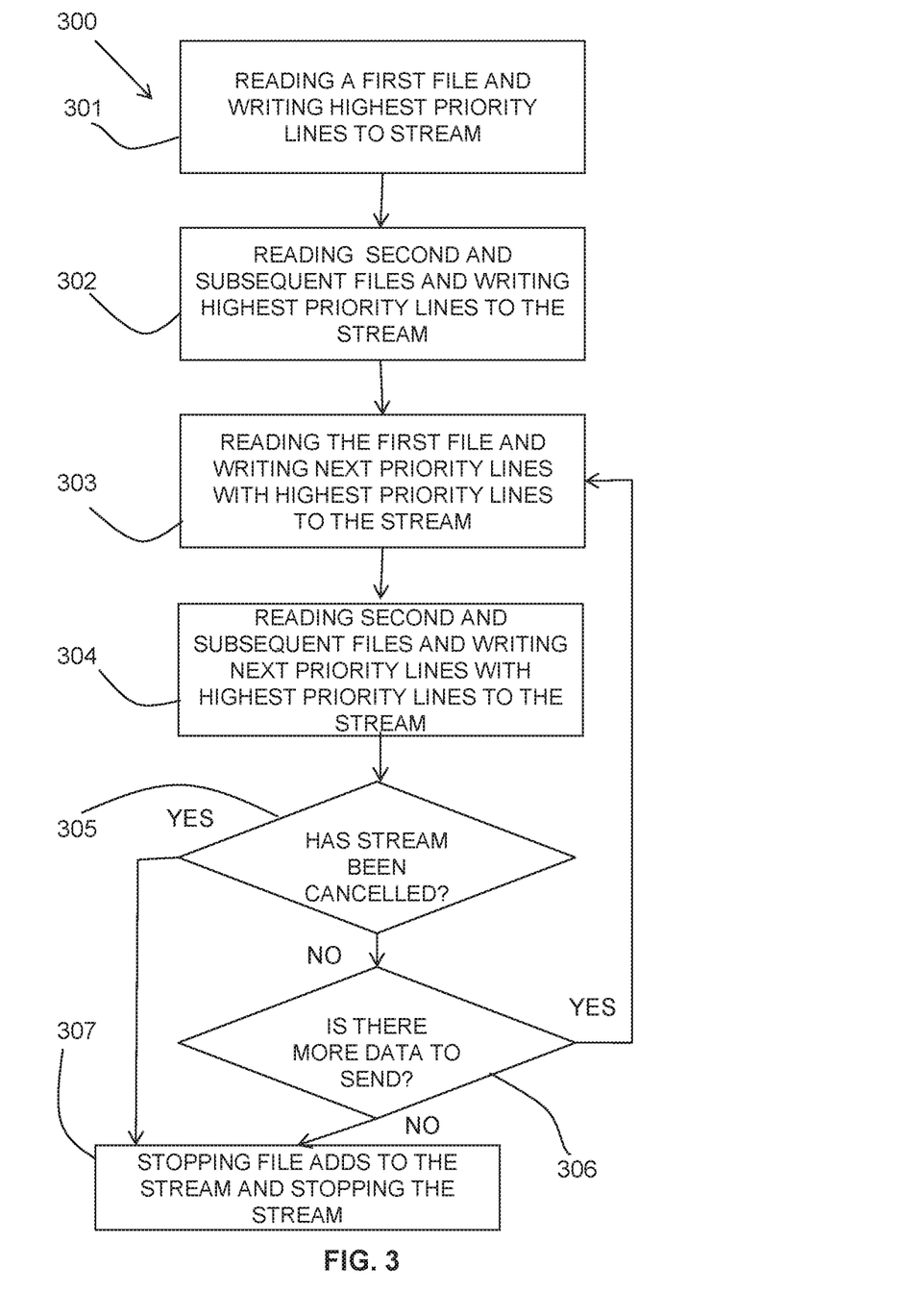
FIG. 3 is a flow diagram of a method in accordance with another embodiment of the present invention.

When a diagnostic download is started, rather than sending each complete trace file in sequential order, likely leading to a full download of all files, a process flow 300 of FIG. 3 can be carried out.

At block 301, a first file, traceA.log, is read and all the highest priority sections, in this case critical lines are written to the download stream as traceA.log with none of the non-critical lines being sent.

At block 302, a second file, traceB.log, is read and all the highest priority sections, in this case critical lines, are written to the download stream as traceB.log with none of the non-critical lines being sent.

If there were additional files, these can also be read and all the highest priority sections, (for example, in this case the critical lines) written to the download stream, until all files have been read.

Next, at block 303, all of the next priority level sections, in this case the major severity trace lines, can be sent for the first file. If a TAR format for the stream is used, this can mean sending another traceA.log containing both the critical and major severity lines leading to some duplication of data.

Next, at block 304, all of the next priority level sections, in this case the major severity trace lines, may be sent for the second file, traceB.log. This is repeated for any subsequent files.

It can be determined, at block 305, if the stream has been cancelled by the diagnostic system. If it has been cancelled, as indicated by the 'YES' arrow, the process flow 300 proceeds to block 307 where any adding of the files to the download stream is stopped (and optionally the sending of the stream can be stopped). If the stream has not been cancelled, as indicated by the 'NO' arrow, the process flow 300 proceeds to block 306, where it is determined if there are further priority levels. If there are no further priority levels or if there is further data to send, as indicated by the 'NO' arrow, the process flow 300 proceeds to block 307 where any adding of the files to the download stream is stopped (and optionally the sending of the stream can be stopped). If there are further priority levels or non-prioritized data to send, the process flow 300 returns to block 303, as indicated by the 'YES' arrow (e.g., for each minor and debug level).

Once all the priority levels have been sent, any non-prioritized data has been sent, and full trace files have been sent, then the download is complete.

As the above process flow 300 is executed, the downloaded files can be replaced with more detailed versions over time. When the files reach a sufficient level to diagnose the failure, the download can be cancelled without ever needing to send the most detailed levels of tracing.

Note that using a stream format, such as TAR, could lead to duplication of transferred data if each subsequent section sent includes the previously sent data as well as new, lower priority data. In another embodiment, this duplication can be eliminated by sending initial high priority, low detail files followed by a sequence of 'cliffs' that provide the differences between a previously sent file and a currently sent file. In this way, the files may slowly grow with the diagnostic system of the download, i.e., rebuilding the files as the download progresses. This would also allow a more granular, potentially line-by-line, growth of files to occur.

Figure 4:
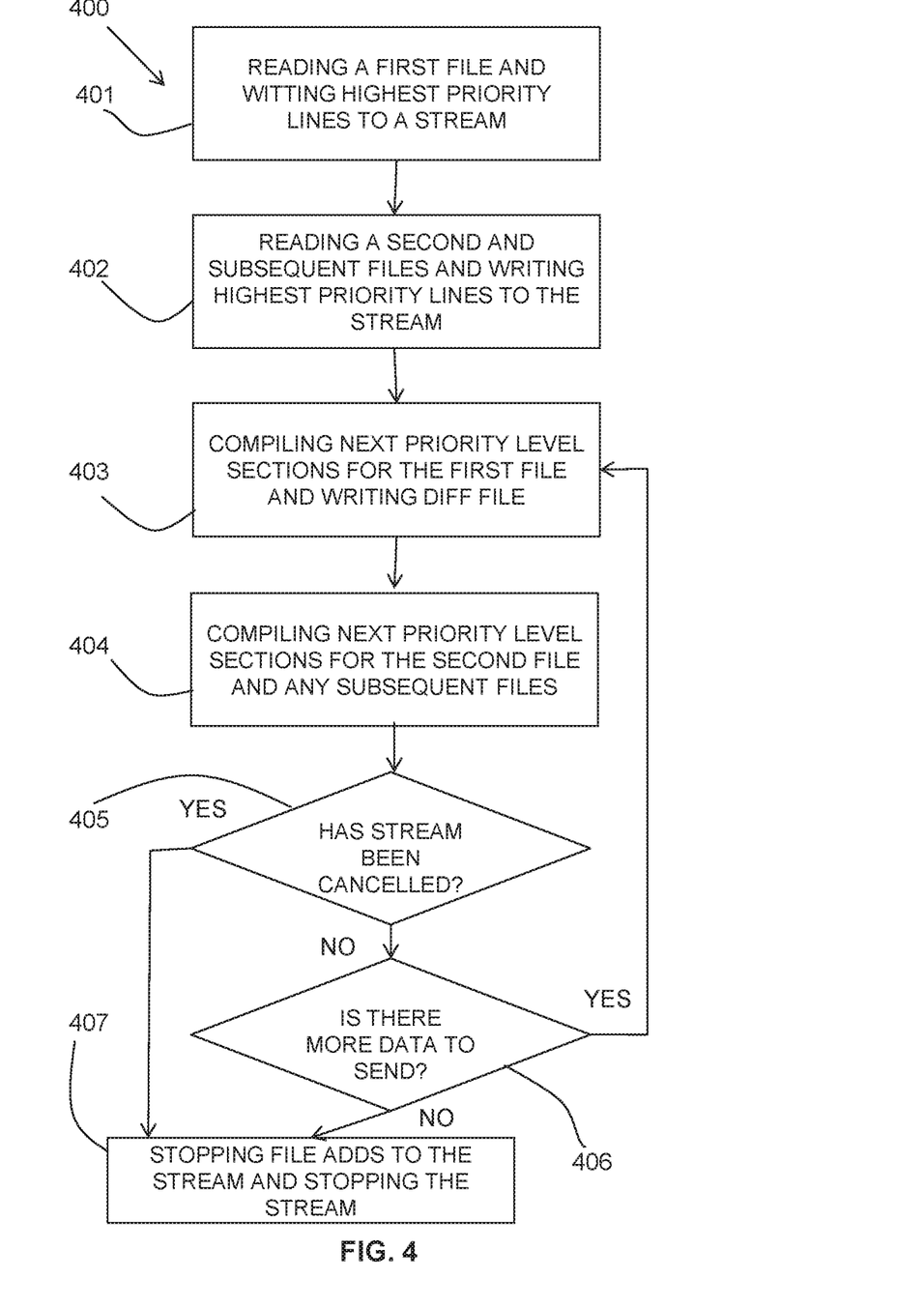
FIG. 4 is a flow diagram of a method in accordance with another embodiment of the present invention.

Referring to FIG. 4, a process flow 400 illustrates this embodiment.

At block 401, a first file, traceA.log, is read and all the highest priority sections, in this case critical lines are written to the download stream as traceA.log with none of the non-critical lines being sent.

At block 402, a second file, traceB.log, is read and all the highest priority sections, in this case critical lines, are written to the download stream as traceB.log with none of the non-critical lines being sent.

Any additional files can also be read and all corresponding highest priority sections, (critical lines) written to the download stream, until all files have been read.

Next, at block 403, all of the next priority level sections, in this case the major severity trace lines, may be compiled for the first file and a diff file may be written containing the differences between the previously written sections and the next priority level sections.

In this example, all of the major severity trace lines may be determined for the traceA.log and a new traceA.log written containing both the critical and major severity lines. A diff file may be written containing the differences between the previous traceA.log (containing only the critical severity lines) and the new traceA.log (containing both the critical and the major severity lines). In this way, the diff file will only include the major severity lines of the new traceA.log.

The above step may be repeated for the second file and any other subsequent files. That is, at block 404, all of the next priority level sections, in this case the major severity trace lines, may be compiled for the second and subsequent files and a diff file may be written containing the differences between the previously written sections and the next priority level sections.

It may be determined, at block 405, whether the stream has been cancelled by the diagnostic system. If it has been cancelled, as indicated by the 'YES' arrow, the process flow 400 proceeds to block 407 where the adding of the files to the download stream is stopped (and optionally the sending of the stream can be stopped).

If the stream has not been cancelled, as indicated by the 'NO' arrow, the process flow 400 proceeds to block 406 where further priority levels are determined. If there are no further priority levels or if there is further data to send, as indicated by the 'NO' arrow, the process flow 400 proceeds to block 407 where the adding of the files to the download stream is stopped (and optionally the sending of the stream can be stopped). If there are further priority levels or non-prioritized data to send, as indicated by the 'YES' arrow, the process flow 400 returns to block 403 (e.g., for each minor and debug level). Once all the priority levels have been sent, any non-prioritized data has been sent, and full trace files have been sent, the download is complete.

As the above process flow 400 is executed, the downloaded files can be constructed at the diagnostic system. An example of the construction at the receiving end is as follows:

i) The first part of traceA.log (the highest priority) is streamed as either a plain file, as it is the first part being transferred, or a diff against an empty initial file. The receiving end reads this streamed file part or diff, discovers this is the first part of the file by recognizing that no local version of this file exists, and writes the streamed part to disk (either by just writing the file straight to disk in the first instance, or applying the diff to an empty file in the second using standard diff techniques).

ii) The next prioritized part of traceA.log is generated as a diff against the previously streamed file part. The receiving end applies this to the traceA.log created as output by the previous step using standard diff techniques to produce a local traceA.log containing the highest and second highest priority trace lines.

iii) Step (ii) is repeated until the download stream is cancelled by the receiving end or the entire file has been sent.

When the files reach a sufficient level to diagnose the failure, the download can be cancelled without ever needing to send the most detailed levels of tracing.

Figure 5:
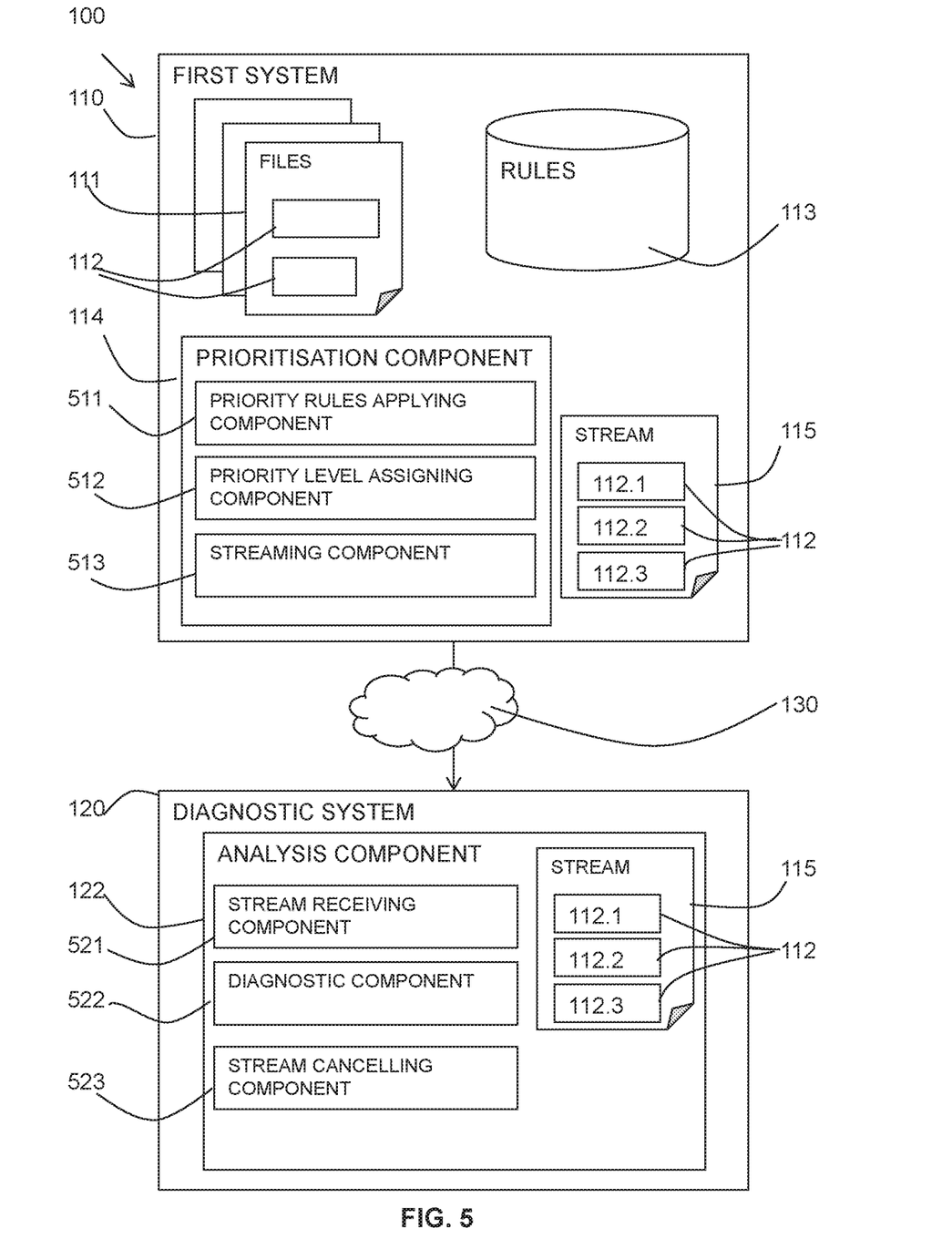
FIG. 5 is a block diagram of a system with respect to FIG. 1 in accordance with another embodiment of the present invention.

Referring to FIG. 5, a block diagram of a system 100 is shown with respect to FIG. 1 in accordance with another embodiment of the present invention.

The prioritization component 114 of the first system 110 may include a priority rules applying component 511 for applying pre-defined priority rules 113 to files 111 to prioritize individual files, or subsets of files by format and content. The prioritization component 114 may also include a priority level assigning component for assigning a priority level to files and/or subsets of files. The prioritization component 114 may also include a streaming component 513 for streaming the files and/or subsets of files in priority level order. The streaming of the files and/or subsets of files may use one of the embodiments described with reference to FIGS. 3 and 4.

The analysis component 122 of the diagnostic system 120 at the receiving end of the downloaded stream 115 may include a stream receiving component 521 which may reconstruct files from the received subsets. The received stream may be diagnosed by a diagnostic component 522 and if a problem is detected the stream download may be cancelled by a stream cancelling component 523.

The described method and system solve drawbacks of existing solutions by enabling diagnostic data to be produced at the most detailed level in all components, rather than restricting diagnostics from some components to reduce volume of data, without needing to download the complete data to begin/complete diagnosis of the failure.

The described method and system extend to the addition of new product components without any manual intervention, if the new component produces diagnostic data in a consistent form with existing components.

The described method and system also provide an automated mechanism for streaming the highest priority diagnostic data first based on a defined policy, which is based on the format of diagnostic data rather than individual components/code modules.

Figure 6:
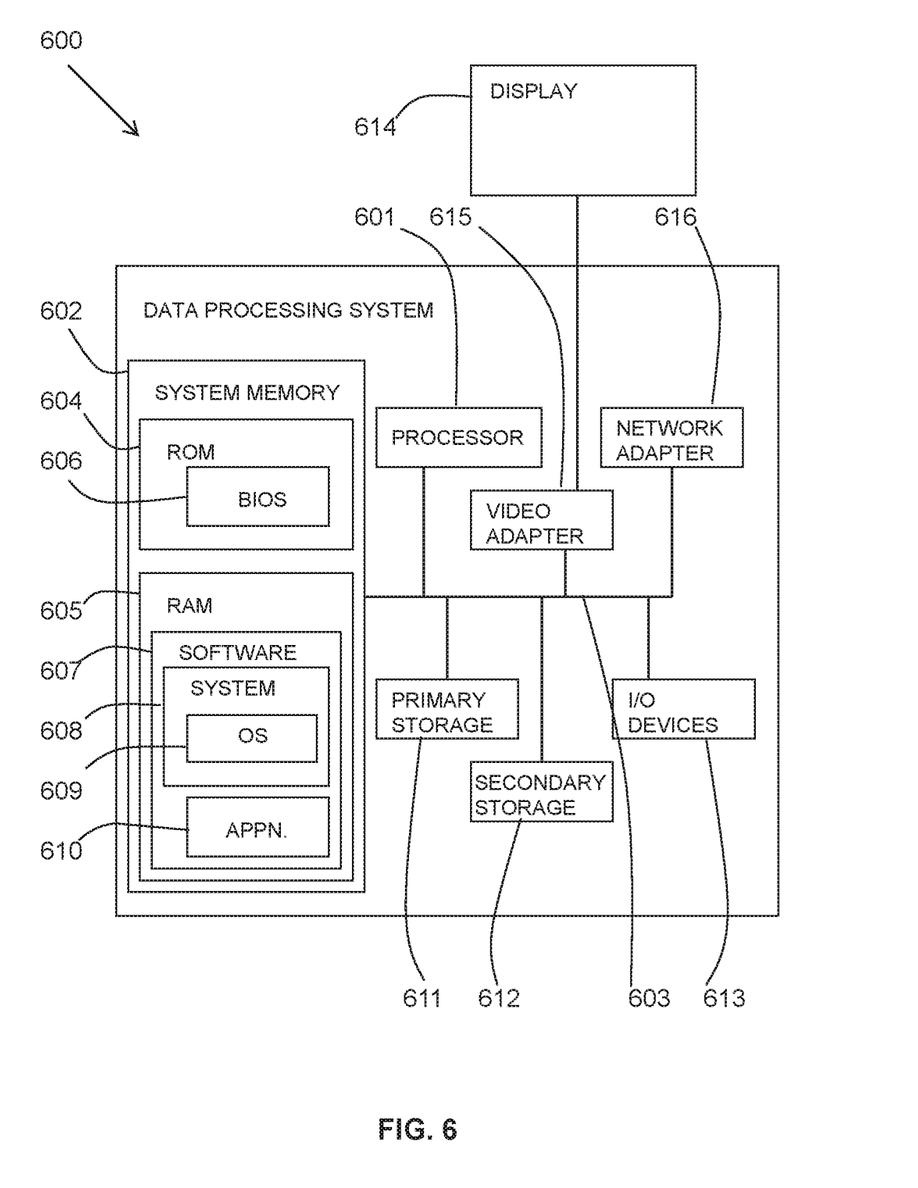
FIG. 6 is a block diagram of a computer system in accordance with an embodiment of the present invention.

Referring to FIG. 6, an exemplary system for implementing aspects of embodiments of the invention includes a data processing system 600 suitable for storing and/or executing program code including at least one processor 601 coupled directly or indirectly to memory elements through a bus system 603. The memory elements may include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. System software 607 may be stored in RAM 605 including operating system software 608. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 may be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the present invention.

In view of the above, embodiments of the disclosure include a method for reducing size of diagnostic data downloads, comprising: reading at least one of a format and a content of one or more diagnostic data files; applying pre-defined priority rules to at least one of the files and the subsets of the files using at least one of the format and the content of the files; assigning a priority level to a file or a subset of a file based on the ability of the file or the subset of the file to diagnose a failure as determined by the priority rules; ordering at least one of the files and the subsets of the files into a file stream; streaming the file stream to a remote diagnostic system; and receiving a notification from the remote diagnostic system to stop the streaming if sufficient diagnostic data to diagnose the failure has been received by the remote diagnostic system.

According to another embodiment or the method embodiment above, the assigning of the priority levels can be at multiple levels of granularity of files and subsets of files formed of sets of one or more data elements, wherein the data elements are defined based on a structure of the file type.

According to another embodiment or any of the method embodiments above, the pre-defined priority rules can prioritize at least one of the files and the subsets by one or more of the group of: a type of file, a content of a file, a format or content of a subset, the closeness of a data element to a failure point, wherein closeness is in the placement in the file or in time.

According to another embodiment or any of the method embodiments above, a subset can be prioritized by the closeness of data elements in the subset to a failure point and subsets progressing outwardly from a failure point are prioritized with decreasing priority levels.

According to another embodiment or any of the method embodiments above, the streaming of the file stream to a remote diagnostic system can include: writing a file or subset of a file having the highest level of priority not yet sent to a stream file, wherein the stream file includes the previous data of the file or subset of a file with higher levels of priority.

According to another embodiment or any of the method embodiments above, the streaming of the file stream to a remote diagnostic system can include: compiling a file or subset of a file having the highest level of priority not yet sent to a stream file and obtaining a difference file between the current file or subset of a file and the previous data of the file or subset of a file with a higher level of priority; and writing the difference file to a stream file.

According to another embodiment or any of the method embodiments above, the remote diagnostic system can reconstruct a file from the difference file.

According to another embodiment or any of the method embodiments above, the method can also operate with reference to the figures.

Embodiments of the disclosure also include a computer program product for reducing size of diagnostic data downloads, the computer program product comprising: a computer-readable storage medium readable by a processing circuit and storing instructions for execution by the processing circuit for performing a method according to any of the method embodiments above.

Embodiments of the disclosure also include a system for reducing size of diagnostic data downloads, comprising: a prioritizing component for reading at least one of a format and a content of one or more diagnostic data files; a priority rules applying component for applying pre-defined priority rules to at least one of the files and subsets of the files using at least one of the format and the content of the files; a priority level assigning component for assigning a priority level to a file or a subset of a file based on the ability of the file or the subset of the file to diagnose a failure as determined by the priority rules; a streaming component for ordering at least one of the files and the subsets of the files into a file stream and streaming the file stream to a remote diagnostic system; and wherein the streaming component is enabled for stopping streaming on receiving a notification from the remote diagnostic system to stop the streaming if sufficient diagnostic data to diagnose the failure has been received by the remote diagnostic system.

According to another embodiment or any of the system embodiments above, the priority level assigning component can be for assigning priority levels at multiple levels of granularity of files and subsets of files formed of sets of one or more data elements, wherein the data elements are defined based on a structure of the file type.

According to another embodiment or any of the system embodiments above, the pre-defined priority rules can prioritize at least one of the files and the subsets by one or more of the group of: a type of file, a content of a file, a format or content of a subset, the closeness of a data element to a failure point, wherein closeness is in the placement in the file or in time.

According to another embodiment or any of the system embodiments above, the priority level assigning component can prioritize a subset by the closeness of data elements in the subset to a failure point and subsets progressing outwardly from a failure point are prioritized with decreasing priority levels.

According to another embodiment or any of the system embodiments above, the streaming component for streaming the file stream to a remote diagnostic system can include: writing a file or subset of a file having the highest level of priority not yet sent to a stream file, wherein the stream file includes the previous data of the file or subset of a file with higher levels of priority.

According to another embodiment or any of the system embodiments above, the streaming component for streaming the file stream to a remote diagnostic system can include: compiling a file or subset of a file having the highest level of priority not yet sent to a stream file and obtaining a difference file between the current file or subset of a file and the previous data of the file or subset of a file with a higher level of priority; and writing the difference file to a stream file.

According to another embodiment or any of the system embodiments above, the remote diagnostic system can reconstruct a file from the difference file.

According to another embodiment or any of the system embodiments above, the system can also operate with reference to the figures.

The invention claimed is:

1. A system for reducing size of diagnostic data downloads, comprising a processor and a memory with instruction thereon, the processor configured to execute the instructions to cause the system to perform:
    reading a format and a content of a diagnostic data file;
    applying pre-defined priority rules to the diagnostic data file utilizing the format and the content;
    assigning a priority level to the diagnostic data file based on an ability of the diagnostic data file to diagnose a failure as determined by the pre-defined priority rules;
    ordering the diagnostic data file into a file stream;
    streaming the file stream to a remote diagnostic system; and
    receiving a notification from the remote diagnostic system to stop the streaming if sufficient diagnostic data to diagnose the failure has been received by the remote diagnostic system.

2. The system of claim 1, wherein the assigning of the priority level to the diagnostic data file includes utilizing multiple levels of granularity based on one or more data elements, wherein the data elements include a structure of a file type.

3. The system of claim 2, wherein the pre-defined priority rules prioritize the diagnostic data file by one or more of:
    a file type, the content, and a closeness of a data element to a failure point with respect to a placement or time.

4. The system of claim 1, wherein a subset of the diagnostic data file is prioritized by the closeness of data elements in the subset to a failure point and subsets further from a failure point are prioritized with decreasing priority levels.

5. The system of claim 1, wherein the streaming of the file stream to the remote diagnostic system includes:
    writing a second diagnostic data file, the second diagnostic data file having a highest level of priority and having not yet been sent to a stream file, wherein the stream file includes previous data with a priority lower than the highest level of priority.

6. The system of claim 1, wherein the streaming of the file stream to the remote diagnostic system includes:
    compiling a second diagnostic data file, the second diagnostic data file having a highest level of priority and having not yet been sent to a stream file and obtaining a difference file of a difference between the diagnostic data file and previous data with a priority lower than the highest level of priority; and
    writing the difference file to a stream file.

7. The system of claim 6, wherein the remote diagnostic system reconstructs an end file from the difference file.

8. A computer program product for reducing size of diagnostic data downloads stored on a computer readable storage medium, the computer program product executable by a processor to cause the processor to perform:
    reading a format and a content of a diagnostic data file;
    applying pre-defined priority rules to the diagnostic data file utilizing the format and the content;
    assigning a priority level to the diagnostic data file based on an ability of the diagnostic data file to diagnose a failure as determined by the pre-defined priority rules;
    ordering the diagnostic data file into a file stream;
    streaming the file stream to a remote diagnostic system; and
    receiving a notification from the remote diagnostic system to stop the streaming if sufficient diagnostic data to diagnose the failure has been received by the remote diagnostic system.

9. The computer program product of claim 8, wherein the assigning of the priority level to the diagnostic data file includes utilizing multiple levels of granularity based on one or more data elements, wherein the data elements include a structure of a file type.

10. The computer program product of claim 9, wherein the pre-defined priority rules prioritize the diagnostic data file by one or more of:
    a file type, the content, and a closeness of a data element to a failure point with respect to a placement or time.

11. The computer program product of claim 8, wherein a subset of the diagnostic data file is prioritized by the closeness of data elements in the subset to a failure point and subsets further from a failure point are prioritized with decreasing priority levels.

12. The computer program product of claim 8, wherein the streaming of the file stream to the remote diagnostic system includes:
    writing a second diagnostic data file, the second diagnostic data file having a highest level of priority and having not yet been sent to a stream file, wherein the stream file includes previous data with a priority lower than the highest level of priority.

13. The computer program product of claim 8, wherein the streaming of the file stream to the remote diagnostic system includes:
    compiling a second diagnostic data file, the second diagnostic data file having a highest level of priority and having not yet been sent to a stream file and obtaining a difference file of a difference between the diagnostic data file and previous data with a priority lower than the highest level of priority; and
    writing the difference file to a stream file.

* * * * *